United States Patent [19]

Garwood et al.

[11] Patent Number: 4,549,396
[45] Date of Patent: Oct. 29, 1985

[54] CONVERSION OF COAL TO ELECTRICITY

[75] Inventors: William E. Garwood, Haddonfield; James C. Kuo; Solomon M. Jacob, both of Cherry Hill, all of N.J.; John J. Wise, Westport, Conn.

[73] Assignee: Mobil Oil Corporation, New York, N.Y.

[21] Appl. No.: 339,962

[22] Filed: Jan. 18, 1982

Related U.S. Application Data

[63] Continuation of Ser. No. 80,819, Oct. 1, 1979, abandoned, which is a continuation-in-part of Ser. No. 951,100, Oct. 13, 1978, abandoned, which is a continuation-in-part of Ser. No. 602,860, Aug. 6, 1975, abandoned.

[51] Int. Cl.$^4$ ............................................. F02B 43/08
[52] U.S. Cl. ..................................... 60/39.02; 48/210; 48/DIG. 6; 518/703
[58] Field of Search ................... 48/210, DIG. 6; 260/449 R, 449.6 R; 518/703; 60/39.02, 39.46 P; 166/256

[56] References Cited

U.S. PATENT DOCUMENTS

| | | | |
|---|---|---|---|
| 3,904,389 | 9/1975 | Banquy | 48/197 R |
| 3,985,519 | 10/1976 | Kalina et al. | 48/210 |
| 3,986,349 | 10/1976 | Egan et al. | 60/39.02 |
| 4,086,262 | 4/1978 | Chang et al. | 252/455 Z |

Primary Examiner—Peter Kratz
Attorney, Agent, or Firm—A. J. McKillop; M. G. Gilman; L. G. Wise

[57] ABSTRACT

Utilizing air, rather than oxygen, to convert coal to synthesis gas containing very high proportions of inert nitrogen; subjecting this entire gas, possibly with intermediate cleanup, e.g., sulfur removal, to conversion over a special metal-zeolite catalyst to produce a product comprising $C_5$ to $C_{11}$ normally liquid hydrocarbons, a gas containing $C_1$ to $C_4$ hydrocarbons, carbon dioxide and large proportions of nitrogen, and an aqueous product comprising water; utilizing the gas product to run electric power generation equipment, such as a direct fired turbine, at base load levels; storing and accumulating the liquid product; and intermittently using the liquid product for electric power generation to meet higher than base loads, including peak load situations.

20 Claims, 4 Drawing Figures

CONVERSION OF COAL TO ELECTRICITY

This is a continuation of application Ser. No. 80,819, filed Oct. 1, 1979; which is a continuation-in-part of application Ser. No. 951,100, filed Oct. 13, 1978; which is a continuation-in-part of application Ser. No. 602,860, filed Aug. 6, 1975; all now abandoned.

BACKGROUND OF THE INVENTION

1. Field of the Invention

This invention relates to the conversion of coal to electricity via conventional power generation equipment, such as direct fired or steam turbines, or other known types of generator sets. It more particularly refers to an efficient means of maximizing electricity output to meet demand while minimizing capital outlay.

2. Description of the Prior Art

Coal has been used for many years as boiler fuel. For a long time it was the most significant energy source in the electricity generating industry. With the advent of cheap petroleum and natural gas, the use of coal diminished and with increasingly stringent ecological standards being required, the use of coal has shrunk to become a relatively minor factor in the electric power generation industry. Now that natural gas and petroleum are in short supply and have become more expensive, there has been an increasing resurgence in consideration of coal for electric power generation. Two major problems, other than cost, still exist however; the ecological unacceptability of the high sulfur emissions, and the fact that coal, as a solid, is more difficult to handle than the hydrocarbon fluids.

Thus, there has also been an increase in consideration being given to convert coal into a fluid form, via gasification to a mixture comprising carbon monoxide and hydrogen, i.e., synthesis gas, or via hydrogenative liquifaction to a heavy syn-crude type of product. Both of these fluids are relatively easily desulfurized and can be handled very nicely. Coal liquifaction is relatively expensive because it requires the addition of hydrogen from outside sources, such as water, which are not always readily, inexpensively available in proximity to the coal fields. Gasification has generally used oxygen, which is fairly expensive, but readily available anywhere by means of air liquifaction and fractionation.

Electricity generation is a highly capital sensitive industry. Since the generating companies are public utilities, they have an obligation to meet the public's demands for electricity at all times. These demands are by no means uniform or even. In fact, peak loads may be as high as three (3) time base loads. These public utilities must have sufficient generating equipment to meet these peak loads. One way to handle this problem is to have multiple parallel facilities and to run as many of them as needed to supply the power required. This is practical and in fact is the way many electric utilities operate. Using a gaseous fuel feed however requires that reserves of the fuel be kept on hand to meet peak load demand. This has made it necessary to use pressurized fuel storage facilities, in order to conserve space, with the attendant hazards and costs thereof.

If one considers the use of coal, in the form of synthesis gas, for fuel to fire electric power generators, the gaseous fuel storage problem is aggravated by the fact that synthesis gas has a higher volume per BTU than does natural gas or LPG; and if one seeks to avoid the capital requirements of installing an oxygen plant, to support the coal gasification, and therefore desires to use air, the problems of pressurized fuel storage increase by orders of magnitude because of the nitrogen dilution factor.

It is, therefore, an important object of this invention to provide a novel means of converting coal to electricity taking into account the load disparity between base demands and peak demands.

It is another object of this invention to provide a novel means of converting coal to electricity through an intermediate mixture of combustible liquid and gas.

It is still another object of this invention to convert coal to electricity by utilizing air gasification of coal, rather than the more costly oxygen gasification of coal.

Other and additional objects will become apparent from a consideration of this entire specification including the drawing and the claims hereof.

SUMMARY OF THE INVENTION

In accordance with the present invention, there has now been discovered a process to convert coal to electricity which comprises:

gasifying coal with air to form a combustible synthesis gas comprising principally carbon monoxide, hydrogen and nitrogen;

contacting said combustible synthesis gas with a composite heterogeneous catalyst comprising a crystalline aluminosilicate zeolite having a high silica to alumina ratio of at least 15, a constraint index of 1 to 12 and a crystal density of not substantially below about 1.6 grams per cubic centimeter, and a metal value having carbon monoxide reducing activity; at a temperature of about 450° to 850° F., a space velocity of about 0.5 to 10 WHSV and pressures of up to about 1000 psig under a combination of conditions sufficient to convert said synthesis gas to a product, comprising water preferably containing less than 1% organic oxygenated compounds, $C_1$ to $C_{11}$ hydrocarbons, carbon dioxide and nitrogen;

separating said product into a gas comprising principally butane and lighter hydrocarbons ($C_4^-$) and nitrogen, a $C_5^+$ substantially hydrocarbon liquid and an aqueous liquid;

continuously burning the hydrocarbon combustible portion of said $C_4^-$ gas comprising hydrocarbons in an "electricity generating mode", as hereinafter defined, whereby producing a substantially steady quantity of electricity;

storing said $C_5^+$ liquid; and intermittently drawing down said $C_5^+$ stored liquid and burning said drawdown in an electricity generating mode whereby producing incrementally increased quantities of electricity supplementary to said steady quantity of electricity.

A significant feature of the present invention is the utilization of air gasification of coal, rather than oxygen gasification. Thus there is no need for an oxygen plant. It will be appreciated that an oxygen plant is one of the most costly units, if not the most costly unit, in a coal gasification facility. Also an oxygen plant is one of the major utility consumers in a coal gasification facility and thus has a very high operating expense associated with its use. Further, by eliminating the need for an oxygen plant, overall facility design and operation are simplified. It is noteworthy to mention that any operational breakdown in the oxygen plant will cause the entire facility to go off line.

With the benefits of air gasification over oxygen gasification clearly delineated above it would seem at first glance that air gasification would be preferred. Quite the contrary, however, is the case. Air gasification is not extensively applied since for every volume of air used, about 80% is useless nitrogen, while the remaining 20% is valuable oxygen. Thus in the gasification of coal, appreciable volumes of nitrogen would be present in the synthesis gas if air instead of oxygen were used, e.g. about 50 volume % of synthesis gas from air gasification is nitrogen, while only about 1 or 2 volume % of the synthesis gas from oxygen gasification is nitrogen. The use of air gasification in conjunction with synthesis gas conversion using acid zeolites catalysts has been disregarded in the past due to the immense presence of nitrogen in the gasifier synthesis gas and its possible effects on the zeolite. It is known in the art that under the proper conditions nitrogen and hydrogen can combine to form ammonia. It is also known in the art that ammonia is a poison for acid catalysts and that only a trace of ammonia could deactivate acid zeolite catalysts. Thus due to the presence of hydrogen and the large volume of nitrogen in the air gasification synthesis gas, it was believed that ammonia could form in the synthesis gas conversion step and such ammonia would deactivate the acid zeolite component of the conversion catalyst.

Quite unexpectly, however, under the conditions of the present invention, air gasification of coal was used in conjunction with zeolite acid catalyzed synthesis gas conversion without any adverse effect on the zeolite catalyst activity. Therefore the use of the present invention affords the benefits of air gasification of coal without any concomitant disadvantages when used in conjunction with acid catalyzed synthesis gas conversion.

DESCRIPTION OF PREFERRED EMBODIMENTS

Figure 1:
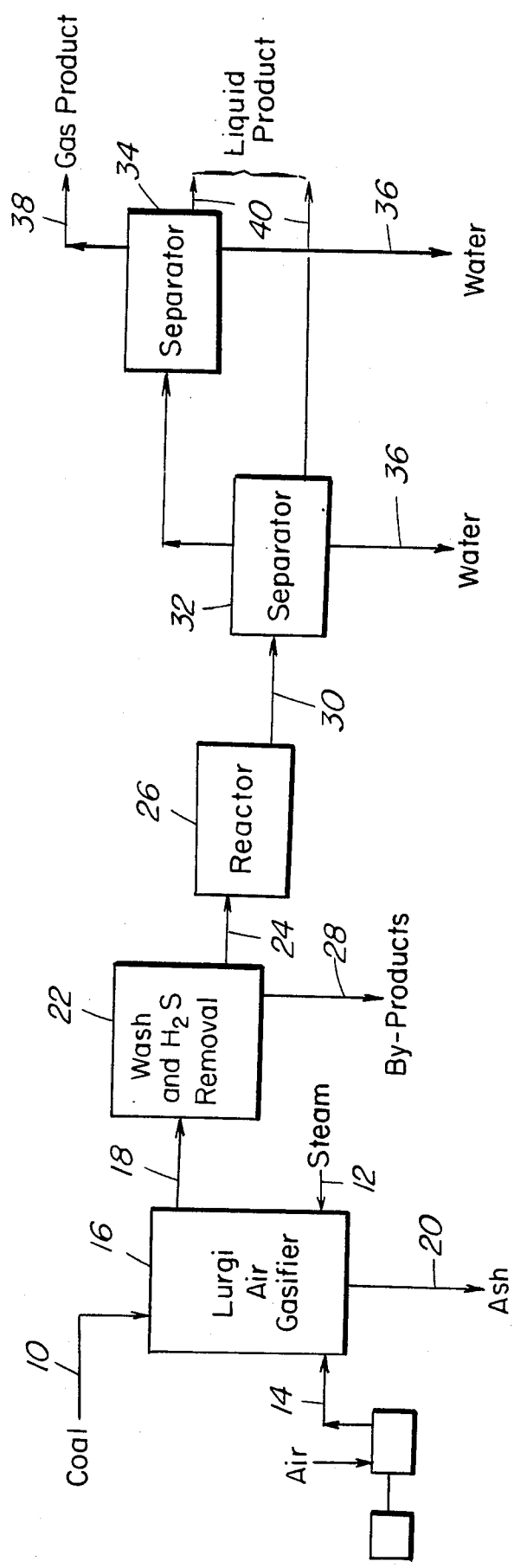
FIG. 1 is a block flow diagram of a general reaction scheme for converting coal into a separately combustible liquid and gas product.

It should be appreciated that the burning of liquid or gaseous hydrocarbons in an "electricity generating mode" is well known and widely practiced commercially. Many suppliers offer conventional turbine, internal combustion or other generator sets which are used by utilities. "Electricity generating mode" as referred to herein refers to methods of producing electricity. It is known that electricity can be generated simply as a function of heat with a proper bimetallic element. With the exception of such singular energy sources such as solar, hydroelectric, geothermal and nuclear, all other commercially used electrical generating means usually involve combustion. In some cases a fuel is burned to produce steam which drives a turbine—this is an indirect generation of electricity. In other cases fuel is burned directly in a turbine.

Similarly, it should be appreciated that the air gasification of coal is a well established process available from different vendors for commercial utilization. One such vendor is Lurgi of Frankfurt, West Germany, whose equipment and designs represent the state of this art for above ground gasification of coal. Alternatively, the air gasification of coal can be conducted in-situ, i.e. underground air gasification of coal. If the coal being gasified has sufficiently high levels of impurities, such as sulfur and/or nitrogen compounds, these are removable from the synthesis gas produced by gasification by conventional technology which is widely available in the art. It is important to note that no invention is claimed in any of these unit processes nor in the equipment necessary to carry them out.

The resolution of a high temperature complex mixture, such as that resulting from the zeolite/metal catalyzed conversion of synthesis gas according to this invention, can be carried out by many diverse techniques. It is practical to resolve this gaseous mixture into its components, an aqueous liquid—a hydrocarbon liquid—and a combustible gas, by condensation such as by refrigeration. It is also possible to condense out the liquid components by causing the gas to do work, such as for example by expanding it through a turbine. Direct or indirect heat exchange with a suitable fluid is a practical means of accomplishing this. Where direct heat exchange is used, it is preferred to use as a cooling fluid, a liquid which has at least some solubilizing effect upon one of the normally liquid components. Thus, cold water can be used for direct heat exchange. Alternatively, naphtha or light fuel oil or other hydrocarbon fractions will serve this purpose. It should be understood that this product resolution and condensation is per se conventional and no invention is here claimed in this particular unit operation.

As was noted above, synthesis gas from coal gasification is known to be useful for combustion conversion to electricity. The problems with the use of this gas as a power plant fuel are the same difficulties encountered with any normally gaseous fuel, storage of a portion of the fuel against peak load demand situation. The particular advantages of configuration of this invention are derived from the recent discovery of a novel process for converting substantial proportions of the active components of synthesis gas, notably carbon monoxide and hydrogen, to a mixed gas-liquid hydrocarbon product. While this synthesis gas conversion is not per se inventive here, it being the subject of other copending patent applications it is the basis of this particular configuration and is responsible, in the ultimate, for its success.

This synthesis gas conversion requires a particular catalyst which is a combination of two essential components. The first component is a metal value having carbon monoxide reducing catalytic activity. Such metal catalysts are in general well known in the chemical and petroleum arts. They have been and are being used commercially as Fischer-Tropsch catalysts, as methanol synthesis catalysts, as ammonia synthesis catalysts and the like. They are generally single or multiple metal species, usually transition metals and usually varivalent. Most of these carbon monoxide reduction catalysts are characterized by their ability to form Pi-bonded complexes, particularly with carbon monoxide. Insofar as the instant invention is concerned, it is desirable that the metal, or metals, component chosen have a relatively weak activity for catalyzing the hydrogenation of light olefins. Particularly preferred metal species for use in this invention are iron, cobalt, nickel, ruthenium, rhodium, rhenium, thorium, zirconium, chromium and mixtures thereof with each other and/or other metals such as the alkali or alkaline earth metals, particularly potassium. A preferred metal value component would be a potassium promoted iron.

The second component of this special catalyst is a crystalline aluminosilicate zeolite which is active for hydrocarbon conversions such as aromatization and/or olefin oligomerization. One particularly preferred type of zeolite which is quite useful in this invention exhibits quite special and unusual properties.

These zeolites induce profound transformations of aliphatic paraffinic and olefinic hydrocarbons to aromatic hydrocarbons in commercially desirable yields and are generally highly effective in alkylation, isomerization, disproportionation and other reactions involving aromatic hydrocarbons. Although they have unusually low alumina contents, i.e. high silica to alumina ratios, they are very active even with silica to alumina ratios exceeding 30. This activity is surprising since catalytic activity of zeolites is generally attributed to framework aluminum atoms and cations associated with these aluminum atoms. These zeolites retain their crystallinity for long periods in spite of the presence of steam even at high temperatures which induce irreversible collapse of the crystal framework of other zeolites, e.g. of the X and A type. Furthermore, carbonaceous deposits, when formed, may be removed by burning at higher than usual temperatures to restore activity. In many environments, the zeolites of this class exhibit very low coke forming capability, conducive to very long times on stream between burning regenerations.

An important characteristic of the crystal structure of this class of zeolites is that it provides constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred zeolites useful as catalysts in this invention possess, in combination: a silica to alumina ratio of at least about 12, and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous in the present invention.

The zeolites useful as catalysts in this invention freely sorb normal hexane and have a pore dimension greater than about 5 Angstroms. In addition, their structure must provide constrained access to some larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is substantially excluded and the zeolite is not of the desired type. Zeolites with windows of 10-membered rings are preferred, although excessive puckering or pore blockage may render these zeolites substantially ineffective. Zeolites with windows of twelve-membered rings do not generally appear to offer sufficient constraint to produce the advantageous conversions desired in the instant invention, although structures can be conceived, due to pore blockage or other cause, that may be operative.

Rather than attempt to judge from crystal structure whether or not a zeolite possesses the necessary constrained access, a simple determination of the "constraint index" may be made by continuously passing a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of catalyst per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Catalysts suitable for the present invention are those which employ a zeolite having a constraint index from 1.0 to 12.0. Constraint Index (CI) values for some typical zeolites including some not within the scope of this invention are:

| CAS | C.I. |
|---|---|
| ZSM-5 | 8.3 |
| ZSM-11 | 8.7 |
| ZSM-23 | 9.1 |
| ZSM-35 | 4.5 |
| TMA Offretite | 3.7 |
| ZSM-12 | 2 |
| ZSM-38 | 2 |
| Beta | 0.6 |
| ZSM-4 | 0.5 |
| Acid Mordenite | 0.5 |
| REY | 0.4 |
| Amorphous Silica-alumina | 0.6 |
| Erionite | 38 |

The above-described Constraint Index is an important and even critical, definition of those zeolites which are useful to catalyze the instant process. The very nature of this parameter and the recited technique by which it is determined, however, admit of the possibility that a given zeolite can be tested under somewhat different conditions and thereby have different constraint indexes. Constraint Index seems to vary somewhat with severity of operation (conversion). Therefore, it will be appreciated that it may be possible to so select test conditions to establish multiple constraint indexes for a particular given zeolite which may be both inside and outside the above defined range of 1 to 12.

Thus, it should be understood that the "Constraint Index" value as used herein is an inclusive rather than an exclusive value. That is, a zeolite when tested by any combination of conditions within the testing definition set forth herein above to have a constraint index of 1 to 12 is intended to be included in the instant catalyst definition regardless that the same identical zeolite tested under other defined conditions may give a constraint index value outside of 1 to 12.

The class of zeolites defined herein is exemplified by ZSM-5, ZSM-11, ZSM-12, ZSM-23, ZSM-35, ZSM-38 and other similar material. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which is incorporated herein by reference.

The specific zeolites described, when prepared in the presence of organic cations, are substantially catalytically inactive, possibly because the intracrystalline free space is occupied by organic cations from the forming solution. They may be activated by heating in an inert atmosphere at 1000° F. for one hour, for example, followed by base exchange with ammonium salts followed by calcination at 1000° F. in air. The presence of organic cations in the forming solution may not be absolutely essential to the formation of this special type zeolite; however, the presence of these cations does appear to favor the formation of this special type of zeolite. More generally, it is desirable to activate this type zeolite by base exchange with ammonium salts followed by calcination in air at about 1000° F. for from about 15 minutes to about 24 hours.

Natural zeolites may sometimes be converted to this type zeolite by various activation procedures and other treatments such as base exchange, steaming, alumina extraction and calcination, alone or in combinations. Natural minerals which may be so treated include ferrierite, brewsterite, stilbite, dachiardite, epistilbite, heulandite and clinoptilolite. The preferred crystalline aluminsilicates are ZSM-5, ZSM-11, ZSM-12 and ZSM-21, with ZSM-5 particularly preferred.

The zeolites used as catalysts in this invention may be in the hydrogen form or they may be base exchanged or impregnated to contain ammonium or a metal cation complement. It is desirable to calcine the zeolite after base exchange. The metal cations that may be present include any of the cations of the metals of Groups I through VIII of the periodic table. However, in the case of Group IA metals, the cation content should in no case be so large as to substantially eliminate the activity of the zeolite for the catalysis being employed in the instant invention. For example, a completely sodium exchanged Na-ZSM-5 appears to be largely inactive for shape selective conversions required in the present invention.

In a preferred aspect of this invention, the zeolites useful as catalysts herein are selected as those having a crystal framework density, in the dry hydrogen form, of not substantially below about 1.6 grams per cubic centimeter. It has been found that zeolites which satisfy all three of these criteria are most desired. Therefore, the preferred catalysts of this invention are those comprising zeolites having a constraint index as defined above of about 1 to 12, a silica to alumina ratio of at least about 12 and a dried crystal density of not substantially less than about 1.6 grams per cubic centimeter. The dry density for known structures may be calculated from the number of silicon plus aluminum atoms per 1000 cubic Angstroms, as given, e.g., on page 19 of te article on Zeolite Structure by W. M. Meier. This paper, the entire contents of which are incorporated herein by reference, is included in "Proceedings of the Conference on Molecular Sieves, London, April, 1967" published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structures. This free space, however, seems to be important as the locus of catalytic activity.

Crystal framework densities of some typical zeolites including some which are not within the purview of this invention are:

| Zeolite | Void Volume | Framework Density |
| --- | --- | --- |
| Ferrierite | 0.28 cc/cc | 1.76 g/cc |
| Mordenite | .28 | 1.7 |
| ZSM-5, 11 | .29 | 1.79 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

In practicing the improved process of this invention, it may be desirable to incorporate the above-described crystalline aluminosilicate zeolite in another material resistant to the temperature and other conditions employed in the process. Such matrix materials include synthetic or naturally occurring substances as well as inorganic materials such as clay, silica and/or metal oxides. The latter may be either naturally occurring or in the form of gelatinuous precipitates or gels including mixtures of silica and metal oxides. Naturally occurring clays, which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in a raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix may vary widely with the zeolite content ranging from between about 1 to about 99 percent by weight and more usually in the range of about 5 to about 80 percent by weight of the composite.

The composite catalyst comprising the metal value having carbon monoxide reducing catalytic activity and the zeolite active for hydrocarbon conversions can be formed by either physically admixing the metal value and the zeolite, or impregnating the metal value in the zeolite by conventional means such as vacuum spray impregnation. It is preferred, however, that the two components be mixed together. The weight ratio of the zeolite component to the metal value component is preferably 0.2/1 to 5/1 and more preferably 0.5/1 to 2/1.

Referring now to the drawings, and particularly to FIG. 1 thereof, coal 10, steam 12 and air 14 are fed to a coal gasifier 16 in which the coal is converted to combustible synthesis gas 18 and ash 20 which is discarded. The combustible synthesis gas 18, comprising some methane, carbon monoxide, hydrogen, carbon dioxide, water and nitrogen, is suitably subjected to purification 22 during which the gas is washed with water and sulfur values are removed, suitably by hydrogen sulfide absorption. Nitrogen values, such as ammonia, may also be removed at this stage. The clean gas 24 is fed to a special reactor 26 while undesirable by-products 28 are removed.

The reactor 26 contains the special metal/zeolite catalyst referred to above and is maintained at a temperature of about 450° to 850° F. and at a pressure of up to about 1000 psig. Throughput is maintained such as to provide a space velocity of about 0.5 to 10 WHSV. The clean combustible synthesis gas 24 is converted in the reactor 26 to a product 30 comprising water, nitrogen, carbon dioxide, $C_1$ to $C_4$ aliphatic hydrocarbons and $C_5$ to $C_{11}$ hydrocarbons. This last fraction may be substantially aliphatic or it may be mixed aliphatic and aromatic hydrocarbons. The total product 30 is in the vapor state and is then suitably condensed, a two stage condenser-separator scheme 32 and 34 is shown, to resolve the product 30 into water 36, a gas fraction which includes light hydrocarbons, such as $C_4^-$ and inorganics, 38, and a normally liquid substantially hydrocarbon fraction 40, which generally comprises the $C_5^+$ hydrocarbons.

Figure 2:
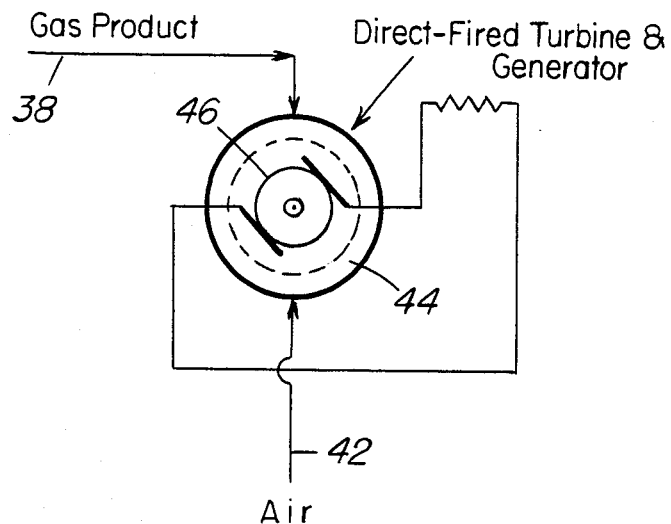
FIGS. 2 and 3 are block flow diagrams showing the utilization of the products produced according to FIG. 1 to produce electricity.

Referring now to FIG. 2, the $C_4^-$ gas is suitably converted to electricity by burning with air 42 in a direct fired turbine 44 which drives a generator 46.

Figure 3:
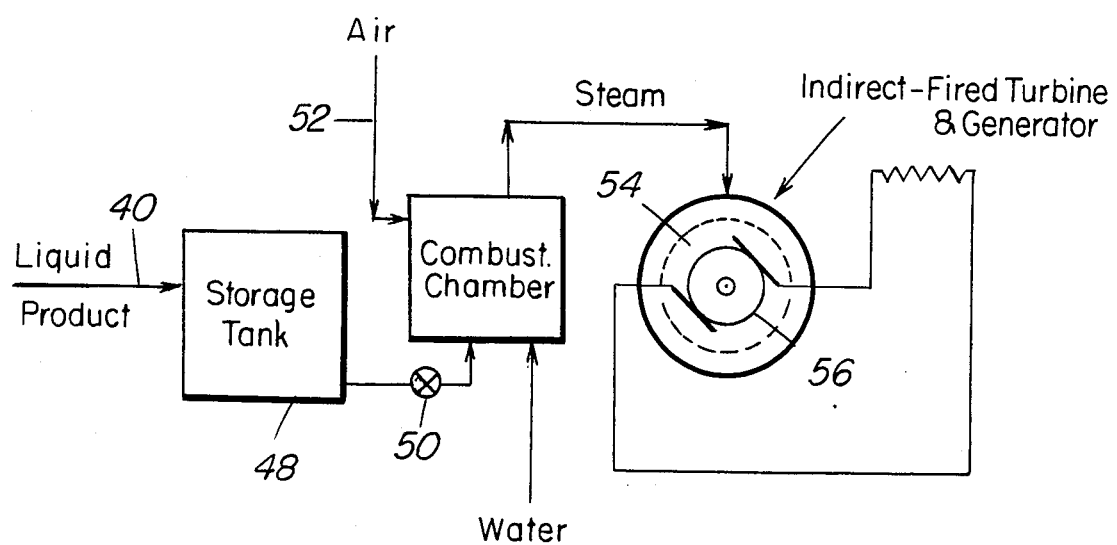

Referring to FIG. 3, the $C_5^+$, normally liquid fraction 40 is stored 48 as it is made in conventional low or no pressure storage facilities. At times of peak electric power demand, the stored liquid is drawn down through a valve 50 and burned with air 52 to produce electric power via a steam turbine 54 and generator 56.

Figure 4:
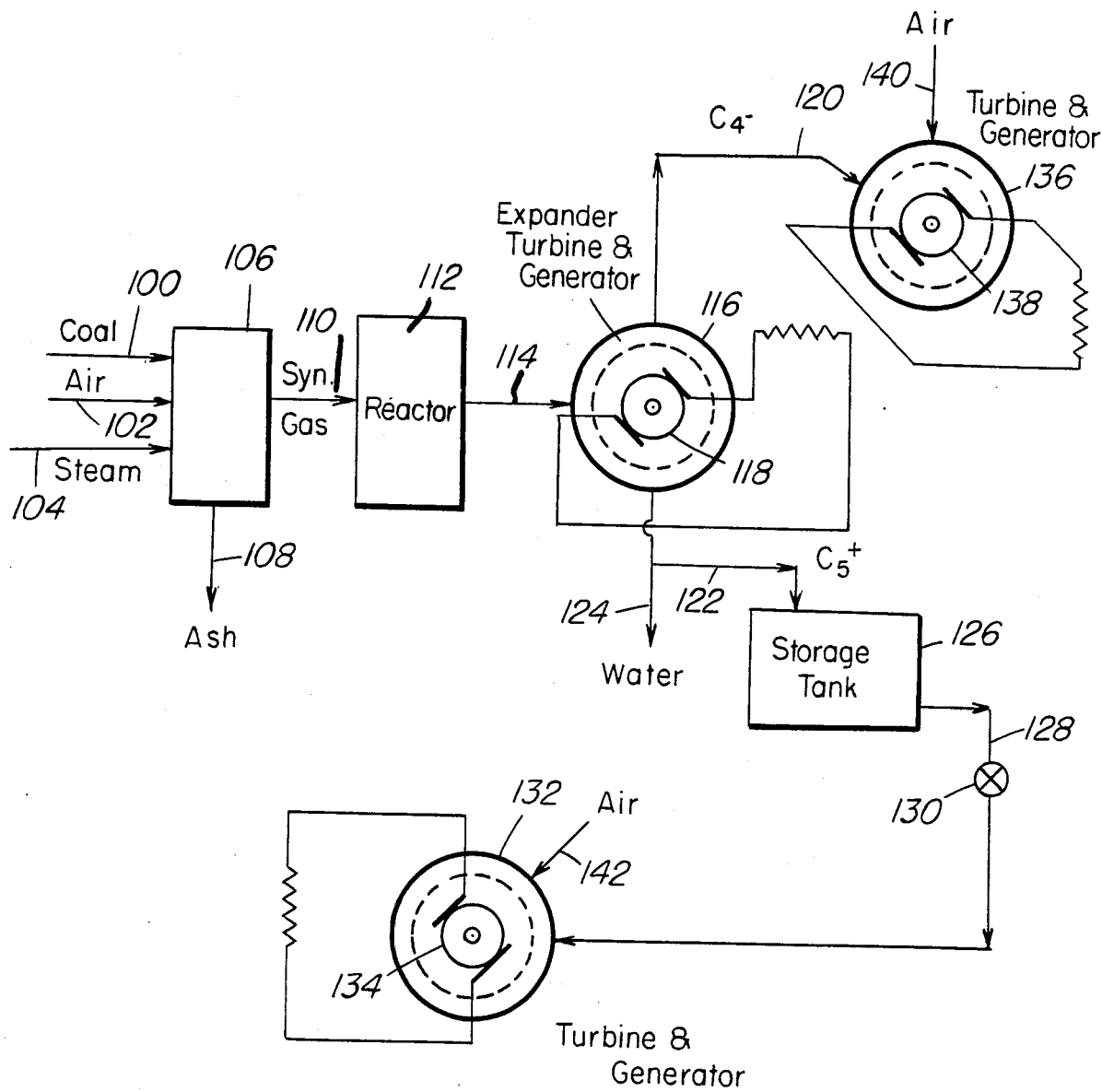
FIG. 4 is one particular overall configuration for carrying out this invention.

Referring to FIG. 4, one embodiment of the overall process of this invention is shown with coal 100, air 102, and steam 104 being fed to a gasifier 106 from which ash 108, and combustible synthesis gas 110, emerge. The combustible synthesis gas 110, is converted in a reactor 112 to a gaseous product 114, which is condensed via an expander turbine 116 coupled to an electricity generator 118. Three product fractions emerge from the condenser means 116, a $C_4^-$ gas 120, containing nitrogen, a substantially hydrocarbon liquid 122, and an aqueous stream 124. The liquid hydrocarbon fraction 122, is stored in a conventional storage means 126, from which it is periodically drawn down, via a conduit 128 and valve 130, and burned, as in a direct-fired turbine 132, coupled to an electricity generator 134. The $C_4^-$ gas 120, is continually burned with air 140, in a turbine 136, which drives a generator 138.

The above described process can be used charging a gas composition typical of that obtained in underground gasification. The advantages of underground gasification are several, avoiding the necessity of sending miners underground or of strip-mining the surface with its attendant ecology problems. A typical composition is used in Example 1 below.

Examples 1 and 2 following herewith serve to illustrate the foregoing.

EXAMPLE 1

A gaseous mixture consisting of 4.7/1/2.4 volumes $H_2/CO/CO_2$ was diluted with 80 volume % $N_2$ and passed over the same catalyst composite as in Example 2 below, at 3410 GHSV (3.88 WHSV), 1000 psig and 600° F. bed setting. Results were as follows:

| | |
|---|---|
| Av. Cat. Temp., °F. | 609 |
| Hot Spot, °F. | 610 |
| CO Conversion, wt % | 74 |
| $H_2$ Conversion, wt % | 46 |
| $CO_2$ Conversion, wt % | 4 |
| Yields, wt % ($N_2$ Free) | |
| Hydrocarbon | 7.5 |
| $H_2$ | 3.6 |
| CO | 5.1 |
| $CO_2$ | 71.2 |
| $H_2O$ | 12.6 |
| Hydrocarbon Composition, wt % | |
| $C_1$ | 11 |
| $C_2$ | 6 |
| $C_3$ | 12 |
| $C_4$ | 17 |
| $C_5$ | 19 |
| $C_6^+$ | 35 |
| $C_6^+$ Aromatics, wt % | 66 |

The data show that the catalyst composite functions satisfactorily in the presence of nitrogen in a volume proportion even greater than that expected from air gasification. A comparison follows immediately hereinbelow.

| Mol % (or Vol %) | Charge to This Example | Underground air Gasification |
|---|---|---|
| $H_2$ | 11.3 | 21.4 |

-continued

| Mol % (or Vol %) | Charge to This Example | Underground air Gasification |
|---|---|---|
| CO | 2.4 | 9.0 |
| $CO_2$ | 5.8 | 17.1 |
| $N_2$ | 80.5 | 46.4 |
| $CH_4$ | — | 4.5 |
| $H_2S$ | — | 0.1 |
| Other | — | 1.5 |

EXAMPLE 2

Four volumes of HZSM-5 extrudate containing 65 parts by wt of 70/1 $SiO_2/Al_2O_3$ ratio HZSM-5 and 35 parts by wt alumina binder were sized to 14–25 mesh and mixed with one volume of K-promoted (0.8 wt % $K_2O$) iron ammonia synthesis catalyst, known by the registered trademark designation as Girdler G-82, which trademark is owned by the Girdler Corp., also sized to 14–25 mesh. The weight ratio of HZSM-5 to iron component was 0.9/1. The catalyst composite was activated with flowing hydrogen at 950° F. for 16 hours.

A gaseous mixture of 5.5/1/2.2 volumes $H_2/CO/CO_2$ was passed over the catalyst composite at 3310 GHSV (2.25 WHSV), 200 psig, and 600° F. bed setting. Results were as follows:

| | |
|---|---|
| Av. Cat. Temp., °F. | 616 |
| Hot Spot, °F. | 622 |
| CO Conversion, wt % | 70 |
| $H_2$ Conversion, wt % | 41 |
| $CO_2$ Conversion, wt % | 8 |
| Yields, wt % | |
| Hydrocarbons | 9.7 |
| $H_2$ | 4.9 |
| CO | 6.1 |
| $CO_2$ | 64.9 |
| $H_2O$ | 14.4 |
| Hydrocarbon Composition, wt % | |
| $C_1$ | 11 |
| $C_2$ | 2 |
| $C_3$ | 10 |
| $C_4$ | 20 |
| $C_5$ | 13 |
| $C_6$ | 44 |
| $C_6^+$ Aromatics, wt % | 50 |

What is claimed is:

1. In the conversion of coal to electricity by the gasification of said coal to a combustible synthesis gas and the combustion of said gas in an electricity generating mode to thereby produce electricity; the improvement which comprises conducting said gasification of coal with air to a combustible synthesis gas comprising carbon monoxide, hydrogen and nitrogen and contacting said combustible gas with a composite catalyst comprising a carbon monoxide reducing metal species component and a hydrocarbon converting crystalline aluminosilicate zeolite component having a high silica to alumina ratio of at least about 15, a constraint index of 1 to 12 and a crystal density of not substantially below about 1.6 grams per cubic centimeter, wherein the weight ratio of said zeolite to said metal species is in the approximate range of between about 0.2/1 and about 5/1, at temperatures of about 450° to 850° F., space velocity of about 0.5 to 10 WHSV and pressures up to about 1000 psig sufficient to convert said combustion synthesis gas to a product comprising a normally liquid fraction comprising $C_5$ to $C_{11}$ hydrocarbon compounds and a gas fraction comprising $C_4^-$ hydrocarbons; continuously burning said $C_4^-$ gas in an electricity generating mode; accumulating and storing said normally liquid fraction in the liquid state; and intermittently burning said stored normally liquid fraction in an electricity generating mode.

2. The improved process claimed in claim 1 wherein said metal species is a Fischer-Tropsch catalyst.

3. The improved process claimed in claim 1 wherein said metal species is selected from the group consisting of iron, cobalt, nickel, rutherium, rhodium, rhenium, thorium, zirconium, chromium and mixtures thereof.

4. The improved process claimed in claim 2 wherein said metal species is iron.

5. The improved process claimed in claim 3 wherein said metal species further comprises other metal selected from the group consisting of alkali and alkaline earth metals.

6. The improved process claimed in claim 1 wherein said zeolite is selected from the group consisting of ZSM-5, ZSM-11, ZSM-12, ZSM-23, ZSM-35 and ZSM-38.

7. The improved process claimed in claim 1 wherein said zeolite is ZSM-5.

8. The improved process claimed in claim 1 wherein said catalyst comprises a potassium promoted iron and ZSM-5.

9. The improved process claimed in claim 1 wherein said metal species and said zeolite are physically mixed to form said composite catalyst.

10. The improved process claimed in claim 1 wherein the weight ratio of said zeolite to said metal species is in the approximate range of between about 0.5/1 and about 2/1.

11. The improved process claimed in claim 1 including removing sulfur values from said combustible synthesis gas.

12. The improved process claimed in claim 1 including resolving said product by condensation of said liquid hydrocarbons and of an aqueous fraction therefrom.

13. The improved process claimed in claim 12 including condensing said product by refrigeration or expansion.

14. The improved process claimed in claim 1 including directly heat exchange cooling said product with a solvent for said normally liquid hydrocarbons.

15. The improved process claimed in claim 1 wherein said gasification is conducted above ground.

16. The improved process claimed in claim 1 wherein said gasification is conducted underground.

17. The improved process claimed in claim 1 including removing ammonia from said combustible synthesis gas.

18. The improved process claimed in claim 1 wherein said burning of $C_4^-$ gas in an electricity generating mode occurs in a direct fired turbine which drives a generator.

19. The improved process claimed in claim 1 wherein said stored normally liquid fraction is burned with air in an electricity generating mode to produce electric power via a stream turbine and generator.

20. The improved process claimed in claim 1 wherein said burning of said stored normally liquid fraction in an electricity generating mode occurs in a direct fired turbine coupled to an electricity generator.

* * * * *